US008239614B2

(12) United States Patent
Asnaashari et al.

(10) Patent No.: US 8,239,614 B2
(45) Date of Patent: Aug. 7, 2012

(54) MEMORY SUPER BLOCK ALLOCATION

(75) Inventors: Mehdi Asnaashari, Danville, CA (US); Alan Chen, Cupertino, CA (US); Siamack Nemazie, Los Altos Hills, CA (US); Dale P. McNamara, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 614 days.

(21) Appl. No.: 12/397,402

(22) Filed: Mar. 4, 2009

(65) Prior Publication Data

US 2010/0228928 A1    Sep. 9, 2010

(51) Int. Cl.
*G06F 12/02* (2006.01)

(52) U.S. Cl. ................. 711/103; 711/170; 711/E12.008

(58) Field of Classification Search .................. None
See application file for complete search history.

(56) References Cited

U.S. PATENT DOCUMENTS

| 6,134,151 | A | 10/2000 | Estakhri et al. |
| 6,141,249 | A | 10/2000 | Estakhri et al. |
| 6,262,918 | B1 | 7/2001 | Estakhri et al. |
| 6,327,639 | B1 | 12/2001 | Asnaashari |
| 7,424,587 | B2 | 9/2008 | Caulkins et al. |
| 2004/0083335 | A1* | 4/2004 | Gonzalez et al. ............. 711/103 |
| 2004/0111553 | A1* | 6/2004 | Conley ............................ 711/103 |
| 2004/0205289 | A1* | 10/2004 | Srinivasan ..................... 711/103 |
| 2005/0144363 | A1* | 6/2005 | Sinclair ........................... 711/103 |
| 2005/0144516 | A1* | 6/2005 | Gonzalez et al. .................. 714/8 |
| 2005/0251617 | A1 | 11/2005 | Sinclair et al. |
| 2008/0052446 | A1 | 2/2008 | Lasser et al. |
| 2008/0155175 | A1 | 6/2008 | Sinclair et al. |
| 2009/0172499 | A1* | 7/2009 | Olbrich et al. ................. 714/773 |
| 2009/0271562 | A1* | 10/2009 | Sinclair .......................... 711/103 |

FOREIGN PATENT DOCUMENTS

| EP | 0803815 A1 | 10/1997 |
| EP | 1739683 A1 | 1/2007 |

OTHER PUBLICATIONS

Li-Pin Chang and Tei-Wei Kuo. "An Adaptive Striping Architecture for Flash Memory Storage Systems of Embedded Systems." Sep. 2002. IEEE. RTAS '02.*
Eran Gal and Sivan Toledo. "Algorithms and Data Structures for Flash Memories." Jun. 2005. ACM. ACM Computing Surveys. vol. 37. pp. 138-163.*

(Continued)

*Primary Examiner* — Kevin Ellis
*Assistant Examiner* — Nathan N Sadler
(74) *Attorney, Agent, or Firm* — Brooks, Cameron & Huebsch, PLLC

(57) ABSTRACT

The present disclosure includes methods and devices for memory block selection. In one or more embodiments, a memory controller includes control circuitry coupled to one or more memory devices having multiple Groups of planes associated therewith, each Group including at least two planes of physical blocks organized into Super Blocks, with each Super Block including a physical block from each of the at least two planes. The control circuitry is configured to receive a first unassigned logical block address (LBA) associated with a write operation and determine a particular free Super Block within a selected one of the multiple Groups to receive data associated with the write operation.

20 Claims, 5 Drawing Sheets

OTHER PUBLICATIONS

Li-Pin Chang and Tei-Wei Kuo. "Efficient Management for Large-Scale Flash-Memory Storage Systems with Resource Conservation." Nov. 2005. ACM. ACM Transactions on Storage. vol. 1. pp. 381-418.*

Dawoon Jung et al. "A Group-Based Wear-Leveling Algorithm for Large-Capactiy Flash Memory Storage Systems." Oct. 2007. ACM. CASES '07.*

Marshall F. McKusick et al. "A Fast File System for UNIX." Aug. 1984. ACM. ACM Transactions on Computer Systems. vol. 2. pp. 181-197.*

International Search Report and Written Opinion for related PCT Application PCT/US2010/000539, mailed Sep. 30, 2010 (11 pgs.).

* cited by examiner

MEMORY SUPER BLOCK ALLOCATION

TECHNICAL FIELD

The present disclosure relates generally to semiconductor memory devices, methods, and systems, and more particularly, to memory block selection.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored information when not powered and can include NAND flash memory, NOR flash memory, read only memory (ROM), Electrically Erasable Programmable ROM (EEPROM), Erasable Programmable ROM (EPROM), and phase change random access memory (PCRAM), among others.

Memory devices can be combined together to form a solid state drive (SSD). A solid state drive can include non-volatile memory, e.g., NAND flash memory and NOR flash memory, and/or can include volatile memory, e.g., DRAM and SRAM, among various other types of non-volatile and volatile memory.

An SSD can be used to replace hard disk drives as the main storage device for a computer, as the solid state drive can have advantages over hard drives in terms of performance, size, weight, ruggedness, operating temperature range, and power consumption. For example, SSDs can have superior performance when compared to magnetic disk drives due to their lack of moving parts, which may ameliorate seek time, latency, and other electromechanical delays associated with magnetic disk drives. SSD manufacturers can use non-volatile flash memory to create flash SSDs that may not use an internal battery supply, thus allowing the drive to be more versatile and compact.

An SSD can include a number of memory devices, e.g., a number of memory chips (as used herein, "a number of" something can refer to one or more of such things, e.g., a number of memory devices can refer to one or more memory devices. As one of ordinary skill in the art will appreciate, a memory chip can include a number of dies. Each die can include a number of memory arrays and peripheral circuitry thereon. A memory array can include a number of planes, with each plane including a number of physical blocks of memory cells. Each physical block can include a number of pages of memory cells that can store a number of sectors of data.

Memory block selection within an SSD can involve determining which physical blocks to write data to and which physical blocks to erase, as well as the order in which the physical blocks are to be written to and erased, for example. The memory cells used in SSDs can be limited to a finite number of write-erase cycles, which can determine the lifetime of the drive. As such, improving memory block selection efficiency and allocation efficiency can increase the life of an SSD.

DETAILED DESCRIPTION

Figure 1:
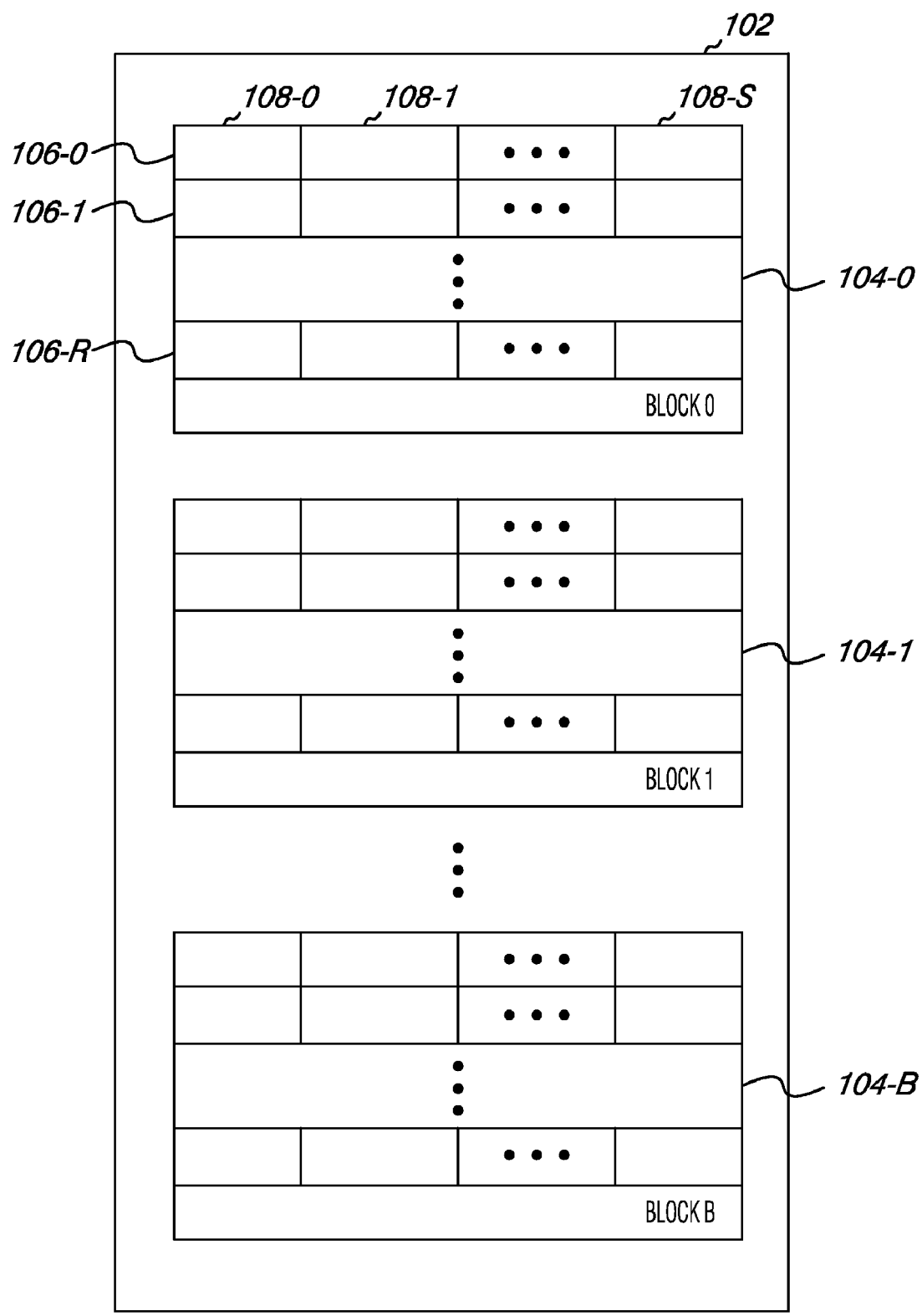
FIG. 1 is a diagram of a memory array that includes multiple physical blocks and can be operated in accordance with one or more embodiments of the present disclosure.

The present disclosure includes methods and devices for memory block selection. In one or more embodiments, a memory controller includes control circuitry coupled to one or more memory devices having multiple Groups of planes associated therewith, each Group including at least two planes of physical blocks organized into Super Blocks, with each Super Block including a physical block from each of the at least two planes. The control circuitry is configured to receive a first unassigned logical block address (LBA) associated with a write operation and determine a particular free Super Block within a selected one of the multiple Groups to receive data associated with the write operation.

In the following detailed description of the present disclosure, reference is made to the accompanying drawings that form a part hereof and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designators "M," "N," "S," "R," and "B," particularly with respect to reference numerals in the drawings, indicates that a number of the particular feature so designated can be included with one or more embodiments of the present disclosure. The designators can represent the same or different number of the particular features.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure, and should not be taken in a limiting sense.

FIG. 1 is a diagram of a memory array 102 that includes multiple physical blocks 104-0 (BLOCK 0), 104-1 (BLOCK 1), . . . , 104-B (BLOCK B) and can be operated in accordance with one or more embodiments of the present disclosure. Although not shown in FIG. 1, one of ordinary skill in the art will appreciate that the memory array 102 can be located on a particular semiconductor die along with various peripheral circuitry associated with the operation thereof.

In the example shown in FIG. 1, the indicator "B" is used to indicate that the array 102 can include a number of physical blocks. As an example, the number of physical blocks in array 102 may be 128 blocks, 512 blocks, or 1,024 blocks, but embodiments are not limited to a particular multiple of 128 or to any particular number of physical blocks in an array 102. Further, embodiments are not limited to the type of memory used in the array, e.g., non-volatile, volatile, etc. In the embodiment illustrated in FIG. 1, the memory array 102 can be, for example, a NAND flash memory array 102.

In this example, each physical block 104-0, 104-1, . . . , 104-B includes memory cells which can be erased together as a unit, e.g., the cells in each physical block can be erased in a substantially simultaneous manner. For instance, the cells in each physical block can be erased together in a single operation. Each physical block, e.g., 104-0, 104-1, . . . , 104-B, contains a number of physical rows, e.g., 106-0, 106-1, . . . , 106-R, of memory cells coupled to an access line, e.g., a word line. The indicator "R" is used to indicate that a physical block, e.g., 104-0, 104-1, . . . , 104-B, can include a number of rows. In some embodiments, the number of rows, e.g., word lines, in each physical block can be 32, but embodiments are not limited to a particular number of rows 106-0, 106-1, . . . , 106-R per physical block.

As one of ordinary skill in the art will appreciate, each row 106-0, 106-1, . . . , 106-R can store one or more pages of data. A page refers to a unit of programming and/or reading, e.g., a number of cells that are programmed and/or read together or as a functional group of memory cells. In the embodiment shown in FIG. 1, each row 106-0, 106-1, . . . , 106-R stores one page of data. However, embodiments of the present disclosure are not so limited. For instance, in some embodiments of the present disclosure, each row can store multiple pages of data.

In one or more embodiments of the present disclosure, and as shown in FIG. 1, a page associated with the rows 106-0, 106-1, . . . , 106-R can store data in accordance with a number of physical sectors 108-0, 108-1, . . . , 108-S of data. The indicator "S" is used to indicate that a row, e.g., 106-0, 106-1, . . . , 106-R, can include a number of physical sectors. Each physical sector 108-0, 108-1, . . . , 108-S can correspond to a logical sector and can include overhead information, such as error correction code (ECC) information, and logical block address (LBA) information, as well as user data. As one of ordinary skill in the art will appreciate, logical block addressing is a scheme often used by a host for identifying a logical sector of information. As an example, a logical sector can store information representing a number of bytes of data, e.g., 256 bytes, 512 bytes, or 1,024 bytes. Embodiments are not limited to these examples.

It is noted that other formats and/or configurations for the physical blocks 104-0, 104-1, . . . , 104-B, rows 106-0, 106-1, . . . , 106-R, sectors 108-0, 108-1, . . . , 108-S, and pages are possible. For example, the rows 106-0, 106-1, . . . , 106-R of the physical blocks 104-0, 104-1, . . . , 104-B can include a single logical sector which can include, for example, more or less than 512 bytes of data.

Figure 2:
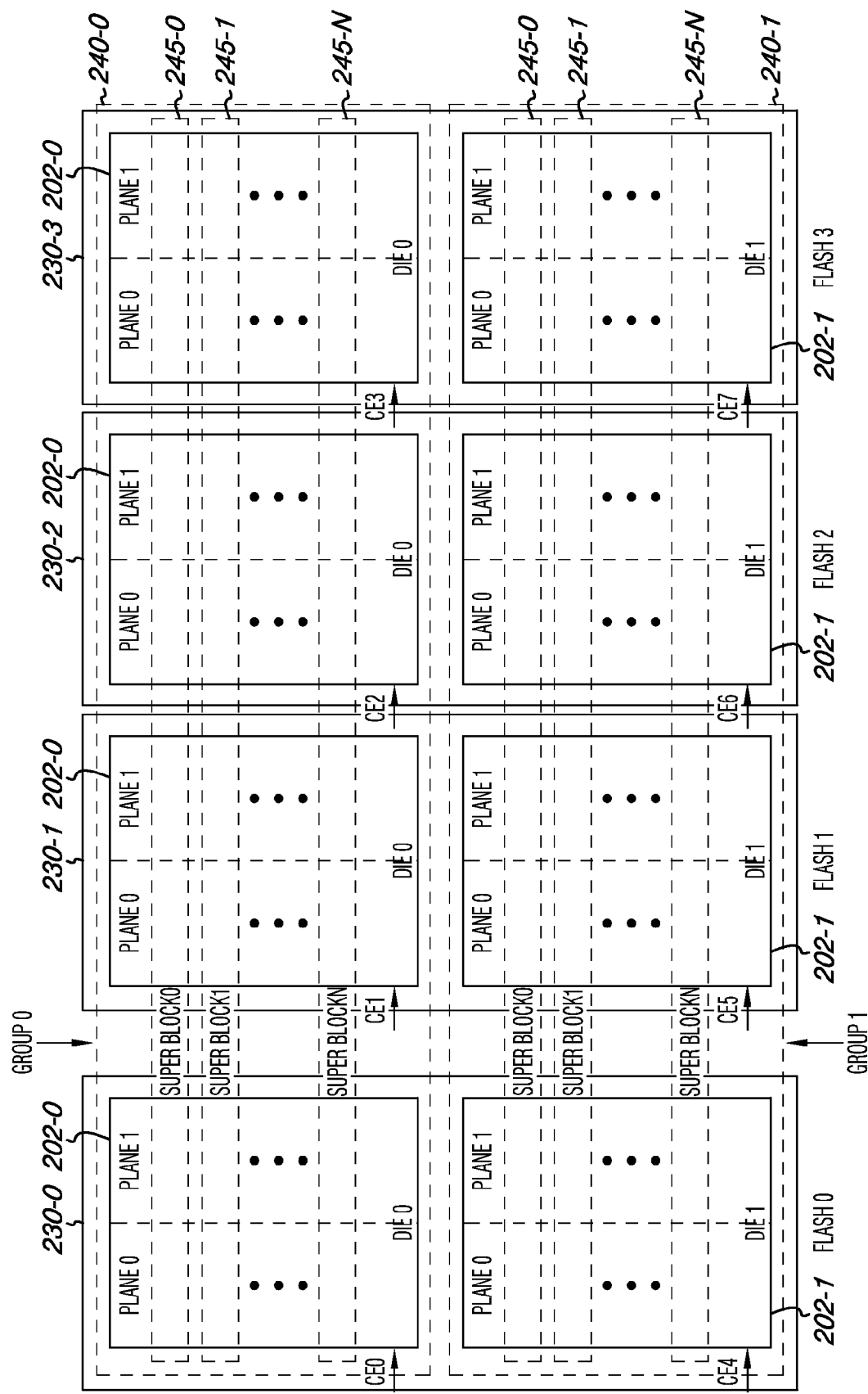
FIG. 2 is a diagram illustrating a number of memory devices having multiple Groups of planes that can be operated in accordance with one or more embodiments of the present disclosure.

FIG. 2 is a diagram illustrating a number of memory devices having multiple Groups of planes that can be operated in accordance with one or more embodiments of the present disclosure. According to one or more embodiments described herein, planes of physical blocks of memory cells are organized into Groups for purposes of memory block selection. In one or more embodiments, a Group can include a number of planes from one or more different memory arrays. In one or more embodiments, the one or more planes corresponding to a Group can be from different memory devices.

The embodiment shown in FIG. 2 includes four memory devices 230-0, 230-1, 230-2, and 230-3. The combination of memory devices 230-0, 230-1, 230-2, and 230-3 can be referred to as a memory unit, such as memory unit 325 described further herein in connection with FIG. 3. In one or more embodiments, the memory devices 230-0, 230-1, 230-2, and 230-3 form a memory unit of a solid state drive (SSD).

The memory devices 230-0, 230-1, 230-2, and 230-3 can each be a semiconductor memory chip including multiple dies per chip. One of ordinary skill in the art will appreciate that each die on a particular chip can include a memory array along with various peripheral circuitry (not shown in FIG. 2) associated with the operation thereof.

In the embodiment illustrated in FIG. 2, each memory device 230-0, 230-1, 230-2, and 230-3 includes two memory arrays 202-0 and 202-1 (shown as DIE 0 and DIE 1, respectively). Each memory array 202-0 and 202-1 can be a flash memory array such as array 102 described in connection with FIG. 1. For instance, each memory array 202-0 and 202-1 includes multiple physical blocks of memory cells such as blocks 104-0, 104-2, . . . , 104-B shown in FIG. 1.

As one of ordinary skill in the art will appreciate, the physical blocks of an array, e.g., 202-0 and 202-1, can be organized into multiple planes. For instance, in the embodiment illustrated in FIG. 2, each of the memory arrays are divided into a first plane (PLANE 0) of physical blocks and a second plane (PLANE 1) of physical blocks. However, embodiments of the present disclosure are not limited to a particular number of planes per array. For instance, a memory array may include only one plane or may include more than two planes, in various embodiments.

In the embodiment illustrated in FIG. 2, the planes of physical blocks associated with the memory devices 230-0, 230-1, 230-2, and 230-3 are organized into two Groups, e.g., 240-0 (GROUP 0) and 240-1 (GROUP 1). In the embodiment illustrated in FIG. 2, each Group 240-0 and 240-1 includes each of the planes from each of four memory arrays. For instance, Group 240-0 includes the planes (PLANE 0 and PLANE 1) of array 202-0 (DIE 0) within each of the four memory devices 230-0, 230-1, 230-2, and 230-3. Group 240-1 includes the planes (PLANE 0 and PLANE 1) of array 202-1 (DIE 1) within each of the four memory devices 230-0, 230-1, 230-2, and 230-3.

Embodiments are not limited to the example shown in FIG. 2. For instance, in one or more embodiments, a Group can include a collection of planes within a single array. As an example, one Group can include PLANE 0 and PLANE I of array 202-0 of device 230-0, another Group can include PLANE 0 and PLANE I of array 202-1 of device 230-0, and another Group can include PLANE 0 and PLANE 1 of array 202-0 of device 230-1.

In some embodiments, a Group can include a number of planes within different arrays of a single memory device. As an example, one Group can include PLANE 0 of array 202-0 and PLANE 0 of array 202-1 of device 230-0, and another Group can include PLANE 1 of array 202-0 and PLANE 1 of array 202-1 of device 230-0. As another example, one Group can include PLANE 0 and PLANE 1 of array 202-0 and PLANE 0 and PLANE 1 of array 202-1 of device 230-0, and another Group can include PLANE 0 and PLANE 1 of array 202-0 and PLANE 0 and PLANE 1 of array 202-1 of device 230-1.

In embodiments in which the arrays, e.g., 202-0 and 202-1, include multiple planes, a Group of planes may, in some embodiments, include one plane from each of one or more arrays of different memory devices. For example, in reference to FIG. 2, in one or more embodiments, each of a number of Groups can include a collection of one plane from each of four memory arrays within the four respective memory devices. For instance, one Group can include PLANE 0 of array 202-0 (DIE 0) within each of the four memory devices 230-0, 230-1, 230-2, and 230-3. A second Group can include PLANE 1 of array 202-0 (DIE 0) within each of the four memory devices 230-0, 230-1, 230-2, and 230-3. A third Group can include PLANE 0 of array 202-1 (DIE 1) within each of the four memory devices 230-0, 230-1, 230-2, and 230-3, and a fourth Group can include PLANET of array 202-1 (DIE 1) within each of the four memory devices 230-0, 230-1, 230-2, and 230-3.

In one or more embodiments, and as illustrated in FIG. 2, the Groups 240-0 and 240-1 each have a number of Super Blocks associated therewith, e.g., SUPER BLOCK 0, SUPER BLOCK 1, ..., SUPER BLOCK N. As used herein, a Super Block can refer to a collection of physical blocks that includes a physical block from each plane within a corresponding Group. In one or more embodiments, a Super Block can span across multiple memory devices. For example, a Super Block can be a collection of physical blocks that includes a physical block from a plane within each of at least two memory arrays within different memory devices within a corresponding Group.

Embodiments are not limited to a particular number of Super Blocks per Group. As an example, a Group, e.g., 240-0 and 240-1, can include 64, 512, or 1,024 Super Blocks per Group. In the embodiment illustrated in FIG. 2, the Super Blocks 245-0, 245-1, ..., 245-N associated with Group 240-0 are each a respective collection of physical blocks including a number of physical blocks from each of the four arrays 202-0, e.g., DIE 0 associated with the four respective memory devices 230-0, 230-1, 230-2, and 230-3. Also, the Super Blocks 245-0, 245-1, ..., 245-N associated with Group 240-1 are each a respective collection of physical blocks including a number of physical blocks from each of the four arrays 202-1, e.g., DIE 1 associated with the four respective memory devices 230-0, 230-1, 230-2, and 230-3.

In one or more embodiments of the present disclosure, a Super Block can be a collection of one physical block per plane for each of a number of planes corresponding to a particular Group. For instance, in the embodiment illustrated in FIG. 2, each of the Super Blocks 245-0, 245-1, ..., 245-N can be a respective collection of eight physical blocks (one block per plane for each array 202-0 of the four different memory devices 230-0, 230-1, 230-2, and 230-3 of the Group).

However, in one or more embodiments, a Super Block does not have to include a physical block from every plane in a given memory array, e.g., 202-0 and 202-1. For instance, in the embodiment illustrated in FIG. 2, each of the Super Blocks 245-0, 245-1, ..., 245-N can be a respective collection of four physical blocks, e.g., one block from one of the planes in each array 202-0 of the four different memory devices 230-0, 230-1, 230-2, and 230-3 of the Group or one block from one of the planes in each array 202-1 of the four different memory devices 230-0, 230-1, 230-2, and 230-3.

In various embodiments, an erase operation can be performed concurrently on the physical blocks of a Super Block. That is, the collection of physical blocks of a particular Super Block can be erased substantially simultaneously. Also, in various embodiments, the pages of physical blocks associated with a particular Super Block can be concurrently read from and written to.

Embodiments of the present disclosure are not limited to the example illustrated in FIG. 2. For instance, in one or more embodiments a Group can include planes of physical blocks within more or less than four memory arrays. As an example, the embodiment shown in FIG. 2 could be organized into four Groups: a first Group could include the planes of arrays 202-0 (DIE 0) within memory devices 230-0 and 230-1; a second Group could include the planes of arrays 202-0 (DIE 0) within memory devices 230-2 and 230-3; a third Group could include the planes of arrays 202-1 (DIE 1) within memory devices 230-0 and 230-1; and a fourth Group could include the planes of arrays 202-1 (DIE 1) within memory devices 230-2 and 230-3. In this example, Super Blocks associated with the four Groups could include two physical blocks (one physical block from each of the two arrays associated with the particular Group) or could include four physical blocks (one physical block per plane for each of the two arrays associated with the particular Group). As an example, a Super Block of four physical blocks (one physical block per plane for each of the two arrays associated with the particular Group) can include 128 pages per physical block and 8 physical sectors per page (assuming 4 KB pages), for a total of 4,096 physical sectors per Super Block. In this example, a LBA range of 4,096 addresses can be mapped to a particular 4,096 sector physical Super Block. However, embodiments of the present disclosure are not limited to a particular page size, sector size, and/or physical block size. For instance, embodiments are not limited to a particular number of sectors per Super Block.

In one or more embodiments, the physical blocks within a particular Super Block, e.g., 245-0 to 245-N, can have different block position numbers. That is, the physical blocks within a particular Super Block can be located at different locations within the planes corresponding to a given Group, e.g., 240-0 and 240-1. As one example, consider the physical blocks corresponding to Super Block 245-0 of Group 240-0. The collection of physical blocks corresponding to Super Block 245-0 can include physical blocks located near a top portion of array 202-0 of device 230-0 and can include physical blocks located near the middle or lower portion of the arrays 202-0 of devices 230-1, 230-2, and 230-3.

As described further below in connection with FIG. 3, a memory system, such as a solid state drive, can include a controller that can receive logical block addresses (LBAs) associated with data write operations from a memory access device, e.g., a processor of a host device such as a laptop, a PC, a media player, a digital camera, etc. The controller can then determine a particular physical location, e.g., a physical block address (PBA), at which the data corresponding to the write operation is to be written. The controller may use various methods for determining the location of a free block to which the data is to be written. For instance, one or more look up tables (LUTs) may be maintained for mapping LBAs to free PBAs.

Figure 3:
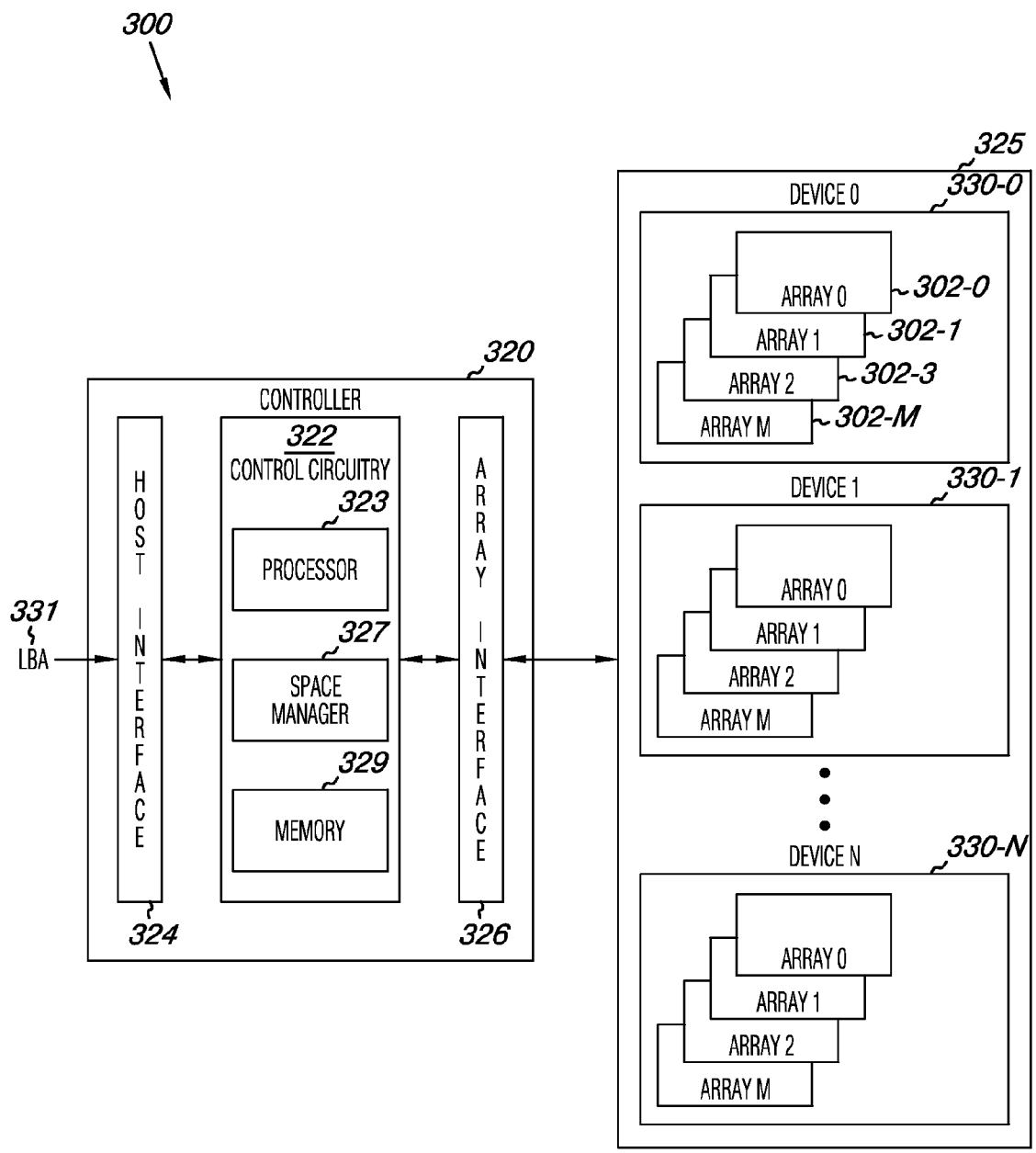
FIG. 3 is a functional block diagram of a memory system in accordance with one or more embodiments of the present disclosure.

FIG. 3 is a functional block diagram of a memory system 300 in accordance with one or more embodiments of the present disclosure. In one or more embodiments, the system 300 is a solid state drive. That is, the embodiment of FIG. 3 can illustrate the components and architecture of one embodiment of a solid state drive 300. In the embodiment illustrated in FIG. 3, the system 300 includes a controller 320, a host interface 324, an array interface 326, and solid state memory unit 325.

In the embodiment illustrated in FIG. 3, the memory unit 325 includes a number of memory devices 330-0, 330-1, ..., 330-N. As an example, the memory devices can be non-volatile memory devices such as flash memories, e.g., NAND flash or NOR flash devices, among others. The memory devices 330-0, 330-1, ..., 330-N can be memory devices such as memory devices 230-0, 230-1, 230-2, and 230-3 described in connection with FIG. 2. Although not shown in FIG. 3, in one or more embodiments, each of the memory devices 330-0, 330-1, ..., 330-N can be associated with a particular channel of the SSD 300. That is, the system 300 can be a multi-channel system.

In one or more embodiments, and as illustrated in FIG. 3, each of the memory devices 330-0, 330-1, . . . , 330-N includes a number of memory arrays 302-0, 302-1, 302-3, . . . , 302-M. The memory arrays 302-0, 302-1, 302-3, . . . , 302-M can be arrays such as memory array 102 described in connection with FIG. 1 or memory arrays 202-0 and 202-1 described in connection with FIG. 2. For instance, each of the memory arrays 302-0, 302-1, 302-3, . . . , 302-M can include multiple physical blocks of memory cells. In one or more embodiments, each of the memory arrays 302-0, 302-1, 302-3, . . . , 302-M can represent a single die, and each of the memory devices 330-0, 330-1, . . . , 330-N can represent a memory chip having multiple dies per chip.

In one or more embodiments, the planes of physical blocks of memory cells within memory unit 325 can be organized into multiple Groups as described above in connection with FIG. 2. For instance, the Groups can have a number of Super Blocks associated therewith. The Super Blocks can be respective collections of physical blocks with each collection including a physical block from multiple planes corresponding to the Group.

As illustrated in FIG. 3, the memory unit 325 can be coupled to the controller 320 via an array interface 326. The array interface 326 can be used to communicate information between the memory unit 325 and the controller 320. The controller 320 can be coupled to a memory access device, e.g., a processor of a host device (not shown), via host interface 324. A host device can include a computing device such as a personal computer (PC), a laptop computer, a digital camera, a media player, or a cellular telephone, among various other computing devices. As an example, when the memory unit 325 is used for data storage in a computing device, as illustrated in FIG. 3, the host interface 324 can be a serial advanced technology attachment (SATA), among others, e.g., the controller 320 can be a SATA controller or a USB controller, among others. That is, embodiments are not limited to a particular type of controller 320 and/or host interface 324.

In one or more embodiments, and as illustrated in FIG. 3, the controller 320 includes control circuitry 322. The control circuitry 322 can include a processor 323, a space manager 327, a memory 329, e.g., a RAM, among other control circuitry (not shown) for operation of memory system 300. In one or more embodiments, the controller 320 is used to write data to and read data from the memory unit 325.

In one or more embodiments, the controller 320 can receive logical block addresses (LBAs) 331 from a host device via the host interface 324. In contrast to prior art approaches to memory block selection, in one or more embodiments of the present disclosure, the LBAs 331 received by the controller 320 can be unassigned LBAs. That is, the received LBAs 331 are not pre-assigned to a particular Group, e.g., a group of planes such as Groups 240-0 and 240-1 shown in FIG. 2. Also, in various embodiments, the received LBAs 331 are not pre-assigned to a particular Super Block, e.g., Super Blocks 245-0 to 245-N shown in FIG. 2.

For example, in one or more embodiments, control circuitry, e.g., control circuitry 322, is configured to receive a first unassigned LBA associated with a first write operation and determine a particular free Super Block within a selected one of the multiple Groups to receive data associated with the first write operation. As used herein, an unassigned LBA refers to an LBA that is not pre-assigned to a particular Group, such that when the LBA is received in conjunction with a write operation, the location, e.g., Group, to which the data associated with the write operation is to be written, is not predetermined.

In one or more embodiments, the control circuitry 322 is configured to assign a range of LBAs that includes the first unassigned LBA to the particular free Super Block within the selected one of the multiple Groups. In various embodiments, the control circuitry 322 can be configured to receive a second LBA in association with a second write operation and write data corresponding to the second write operation to the same selected Super Block when the second LBA is within the range of LBAs assigned to the selected Super Block (e.g., the second LBA has not been written to or accessed but is within the range of LBAs previously assigned to a particular Super Block).

In one or more embodiments, the second LBA can be an unassigned LBA (e.g., the second LBA can be an LBA which is not within an LBA range previously assigned to a particular Super Block). In such embodiments, the control circuitry can be configured to assign the second unassigned LBA to a different selected Super Block (e.g., a Super Block other than the selected Super Block to which the data corresponding to the first write operation is written).

In various embodiments, the control circuitry 322 is configured to track, for each of the multiple Groups, a number of free Super Blocks available in each Group. The control circuitry 322 can be configured to select the one of the multiple Groups to receive data associated with the first write operation based, at least partially, on the number of free Super Blocks available in each of the multiple Groups. In one or more embodiments, the control circuitry is configured to select the one of the multiple Groups to receive data associated with the first write operation based, at least partially, on a ratio of free Super Blocks to used Super Blocks for each of the multiple Groups.

In one or more embodiments, the control circuitry 322 is configured to, subsequent to the first write operation, assign the respective selected one of the multiple Groups to the previously unassigned LBA such that data associated with all subsequent write operations corresponding to the previously unassigned LBA is written to a free Super Block within the respective assigned Group.

As described further below in connection with FIGS. 4A-4D, in one or more embodiments, the control circuitry 322 is configured to receive a second LBA associated with a second write operation, e.g., a different LBA associated with a subsequent write operation, and determine a particular free Super Block within a selected one of the multiple Groups to receive data associated with the second write operation. The control circuitry 322 can be configured to select the one of the multiple Groups to receive data associated with the subsequent write operation on a round-robin basis. In various embodiments, the selected one of the multiple Groups associated with the subsequent write operation is different from the selected one of the multiple Groups associated with the write operation.

As used herein, the terms first write operation and second write operation can be used to indicate different write operations, e.g., a particular write operation and a subsequent write operation. That is, the terms first and second write operation are not limited to consecutive operations or to a particular time of performance.

In various embodiments, once an unassigned LBA is assigned to a particular Group (e.g., to a particular Super Block within a selected one of multiple Groups in a first write operation), the particular LBA (e.g., the previously unassigned LBA) may be updated in association with a second (e.g., subsequent) write operation. In one or more embodiments, a new free Super Block is assigned to the previously unassigned LBA in association with the second write operation such that the updated data corresponding to the second write operation is written to the new Super Block (e.g., a Super Block different from the Super Block to which the data corresponding to the particular LBA was written in the first operation). In one or more such embodiments, the new Super Block can be in the same Group or a different Group than the Super Block to which the data corresponding to the particular LBA was written in the first operation.

As described herein, the new Super Block can be selected, in association with the second write operation, in various manners (e.g., based on a count of free Super Blocks determined for each of the Groups, based on a ratio of free Super Blocks to used Super blocks associated with each of the Groups, in a round-robin basis among the Groups, etc.). For instance, in some embodiments, the control circuitry 322 can be configured to determine, for each of the multiple Groups, a current number of free Super Blocks and select the one of the multiple Groups to receive the data corresponding to the second write operation based, at least partially, on the current number of free Super Blocks determined for each of the multiple Groups. In various embodiments, the data corresponding to the second write operation is written to a Super Block within the Group having the highest number of free Super Blocks.

As an example, in some embodiments, each of the Super Blocks may be able to store 4,096 sectors of data which can correspond to 4,096 LBAs (e.g., assuming that an LBA corresponds to one sector of data, in this example). In this example, a range of 4,096 LBAs can be assigned to each of the Super Blocks. In various embodiments, if the control circuitry receives a LBA that is within a LBA range previously assigned to a particular Super Block, then the data corresponding to the LBA is written to the same particular Super Block. If the received LBA is an unassigned LBA (e.g., a LBA that is outside of an LBA range previously assigned to a Super Block), then the data corresponding to that LBA is written to a new (e.g., different) Super Block.

In various prior art approaches to memory block selection in which the physical blocks of memory cells of a memory unit such as memory unit 325 are organized into multiple Groups such as Groups 240-0 and 240-1 shown in FIG. 2, each LBA or particular range of LBAs received by a controller, in conjunction with a write operation, are pre-assigned to a particular Group. In such prior approaches, the controller receives a particular LBA and then searches the particular Group to which the LBA is pre-assigned in order to find a free Super Block within that particular Group to which the data is then written.

However, in various instances, an operating system or application program associated with the host device may update, e.g., re-write, data to the same LBA or LBA range. For instance, the data corresponding to a particular LBA can be updated frequently. In such cases, since the particular LBA is pre-assigned to a particular Group, each subsequent write operation corresponding to the particular LBA results in the controller writing data to a selected physical block within the same Group. Such prior art memory block selection approaches can result in uneven wear across the memory unit as physical blocks within certain Groups are programmed, e.g., written to and erased, frequently, while physical blocks within other Groups may remain rarely used. Uneven wear across a memory unit such as memory unit 325 can lead problems such as uncorrectable write errors and erase errors associated with the heavily used physical blocks and can reduce the useful lifetime of the memory unit.

In one or more embodiments, selection of the particular Group to which the data associated with the first write operation is to be written and of the particular Group to which the data associated with the second write operation is to be written is performed on a round-robin basis. That is, if a particular Group is selected to receive the data associated with the first write operation, then a different Group is selected to receive the data associated with the second write operation. In one or more embodiments, different Groups can be selected to receive data associated with subsequent write operations until each of the Groups has been selected to receive data at least once.

In one or more embodiments, the control circuitry, e.g., 322, can be configured to track, for each of the multiple Groups of memory arrays, the number of free Super Blocks available in each Group, e.g., Group 240-0 and 240-1 described in connection with FIG. 2. As an example, a count of the number of free Super Blocks within each Group can be maintained. As another example, in one or more embodiments, a list, e.g., a look-up table (LUT), can be maintained, which indicates the number of free Super Blocks available for each Group. The count and/or list can be stored in various locations such as within a memory 329 of controller 320 or within the memory unit 325, among other locations. As one of ordinary skill in the art will appreciate, the functions of the control circuitry 322 may be performed by other types of hardware, software, and/or firmware.

In one or more embodiments, selection of the particular Group to which the data associated with a particular write operation is to be written and of the particular Group to which the data associated with a subsequent write operation is to be written is based, at least partially, on the number of free Super Blocks available in each of the multiple Groups. For instance, in various embodiments, the particular Group having the highest number of free Super Blocks is selected to receive the data associated with the first write operation. Also, in various embodiments, the particular Group having the highest number of free Super Blocks is selected to receive the data associated with the subsequent write operation. In embodiments in which the particular Groups are selected based on the Group having the highest number of free Super Blocks, the selected Group may be the same for both the particular and the subsequent write operations.

In one or more embodiments, selection of the particular Group to which the data associated with a particular write operation is to be written and of the particular Group to which the data associated with a subsequent write operation is to be written is based, at least partially, on a ratio of free Super Blocks to used Super Blocks for each of the multiple Groups. In various embodiments, the control circuitry can be configured to determine an initial ratio of free to used Super Blocks (e.g., upon initialization) for each of the Groups, e.g., Groups 240-0 and 240-1 shown in FIG. 2, and then can update the ratios for each Group when a free Super Block is written to. As an example, in various embodiments, the particular Group having the highest ratio of free Super Blocks to used Super Blocks is selected to receive the data associated with the first write operation. Also, in various embodiments, the particular Group having the highest ratio of free Super Blocks to used Super Blocks is selected to receive the data associated with the subsequent write operation. In embodiments in which the particular Groups are selected based on the Group having the highest ratio of free Super Blocks to used Super Blocks, the selected Group may be the same for both the particular and the subsequent write operations.

In one or more embodiments, the control circuitry, e.g., 320, is configured to determine a particular Super Block within the selected Group to which the data corresponding to the particular received LBA is to be written. For instance, a table associated with the selected Group can be searched to determine an appropriate free Super Block within the selected Group. In one or more embodiments, the control circuitry can be configured to, subsequent to the first write operation, assign the selected one of the multiple Groups to a first particular unassigned LBA such that data associated with all subsequent write operations corresponding to the previously unassigned LBA is written to a free Super Block within the assigned Group.

That is, in one or more embodiments, once an unassigned LBA is received by a controller in conjunction with a particular write operation and the data associated therewith is written to a Super Block within the selected Group, the controller can assign that particular LBA to the particular selected Group such that when the controller receives the same particular LBA, in conjunction with subsequent write operations, the data is written to the assigned Group. In some such embodiments, once a second particular unassigned LBA is received by the controller in conjunction with a next particular write operation and the data associated therewith is written to a different selected Group, e.g., a selected Group different from the particular selected Group associated with the first particular unassigned LBA, the controller can assign that second particular LBA to the different selected Group such that when the controller receives the second particular LBA, in conjunction with subsequent write operations, the data is written to the assigned different Group.

Figure 4A:
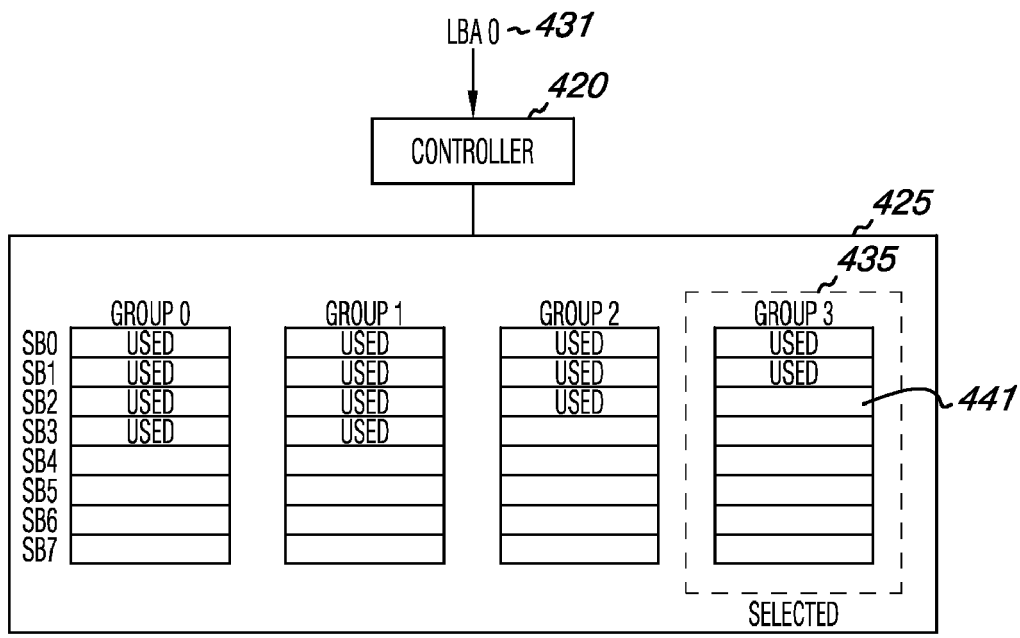
FIGS. 4A, 4B, 4C, and 4D are functional block diagrams showing memory block selection in accordance with one or more embodiments of the present disclosure.
Figure 4B:
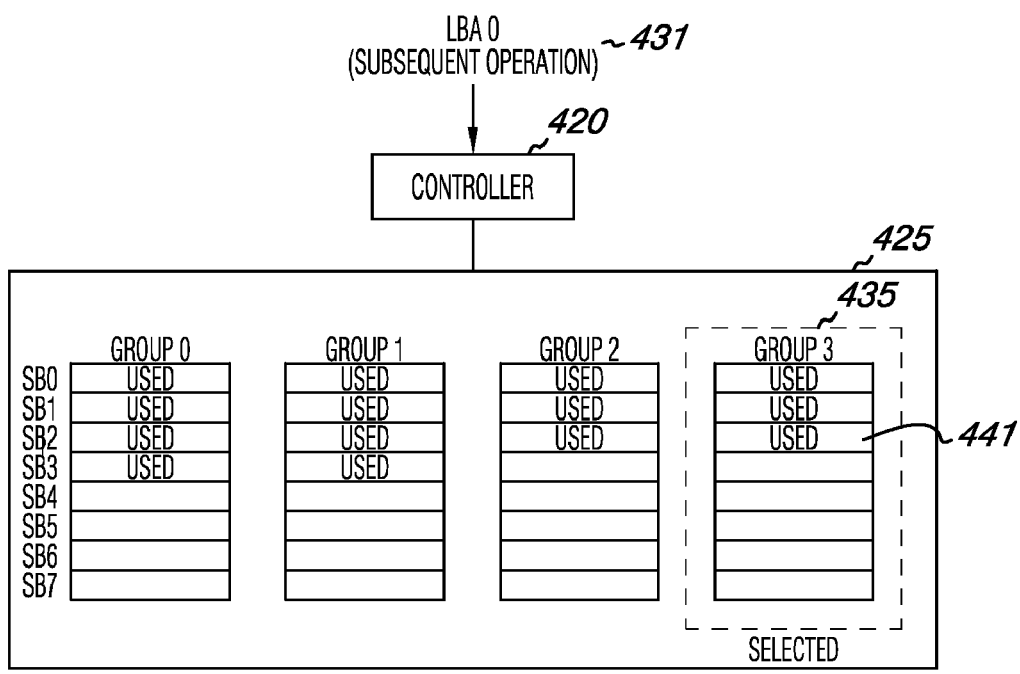

FIGS. 4A, 4B, 4C and 4D are functional block diagrams showing memory block selection in accordance with one or more embodiments of the present disclosure. In the embodiment illustrated in FIG. 4A, logical block address 431 represents a particular unassigned LBA (LBA 0) received by a controller 420 in association with a particular write operation. FIG. 4B illustrates the status of the physical Super Blocks (e.g., Super Blocks 245-0 to 245-N shown in FIG. 2) within a number of Groups of planes (e.g., Groups 240-0 and 240-1 shown in FIG. 2) subsequent to the write operation of FIG. 4A, e.g., subsequent to a first write operation.

Figure 4C:
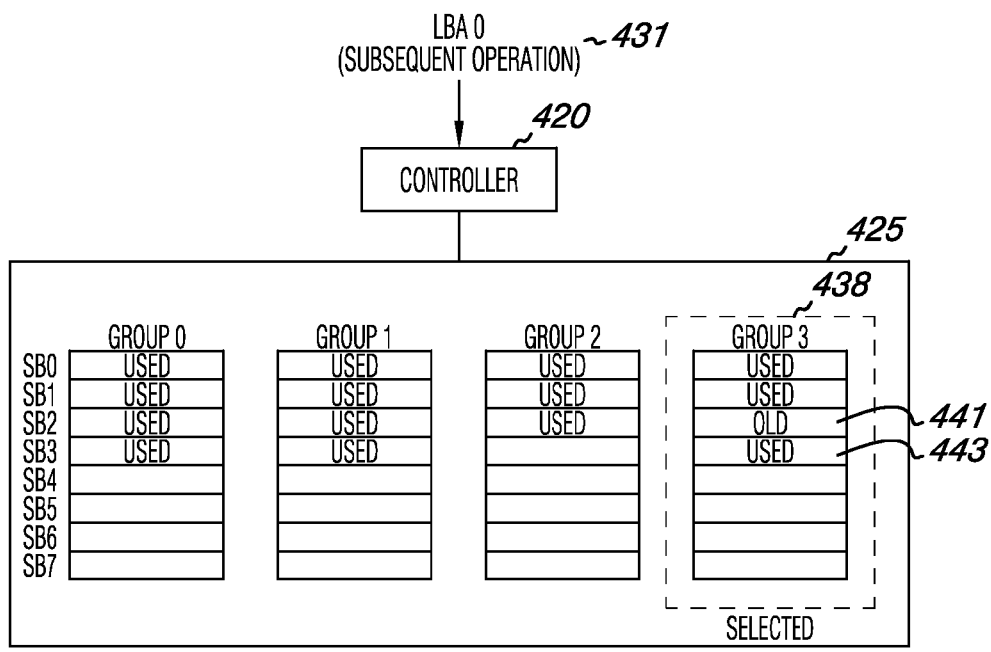

In the embodiment illustrated in FIG. 4C, logical block address 431 represents the same particular LBA (LBA 0) received by the controller 420 in association with a subsequent write operation, e.g., a write operation subsequent to the operation of FIGS. 4A and 4B. That is, the logical block address 431 in FIG. 4C represents LBA 0 in an updated state, e.g., the data associated with LBA 0 is updated data. Similarly, in the embodiment illustrated in FIG. 4D, logical block address 431 represents the same particular LBA (LBA 0) received by the controller 420 in association with a write operation subsequent to the operation of FIGS. 4A and 4B. That is, the logical block address 431 in FIG. 4D also represents LBA 0 in an updated state, e.g., the data associated with LBA 0 is updated data. The controller 420 can be a controller such as controller 320 described above in connection with FIG. 3.

In the embodiment illustrated in FIGS. 4A, 4B, 4C, and 4D the controller 420 is coupled to a memory unit 425, e.g., a memory unit such as memory unit 325 described in connection with FIG. 3. As illustrated, the memory unit 425 is organized in a number of Groups, e.g., GROUP 0, GROUP 1, GROUP 2, and GROUP 3, as shown. The Groups illustrated in FIGS. 4A, 4B, 4C, and 4D can be Groups of planes such as Groups 240-0 and 240-1 described in connection with FIG. 2. For instance, in the embodiment illustrated in FIGS. 4A, 4B, 4C, and 4D, the multiple Groups can each include a respective collection of a physical block from each of the at least two planes corresponding to the Group (e.g. the Groups can include Super Blocks such as Super Blocks 245-0, 245-1, . . . , 245-N described in connection with FIG. 2). As illustrated, each Group includes eight Super Blocks. That is, each Group includes a Super Block located at each one of the positions SB0 through SB7. As described above in connection with FIG. 2, in various embodiments, Super Blocks can include physical blocks from planes located within different memory arrays (e.g., 202-0 and 202-1) and/or within different memory devices (e.g., 230-0, 230-1, 230-2, and 230-3).

The embodiment shown in FIG. 4A illustrates the status of the Super Blocks within each of the Groups (GROUP 0 through GROUP 3) at the time of a write operation, e.g., a first write operation, corresponding to logical block address 431, while FIG. 4B illustrates the status of the Super Blocks within each of the Groups after the write operation and prior to a subsequent operation, e.g., a second write operation. The embodiment shown in FIG. 4C illustrates the status of the Super Blocks within each of the Groups after a subsequent write operation, e.g., a second write operation, corresponding to logical block address 431. The embodiment shown in FIG. 4D also illustrates the status of the Super Blocks within each of the Groups after a subsequent write operation, e.g., a second write operation, corresponding to logical block address 431.

In the embodiments illustrated in FIGS. 4A, 4B, 4C, and 4D, Super Blocks marked as "USED" represent Super Blocks containing valid data and are currently unavailable for receiving data in association with write operations. Super Blocks marked as "OLD" represent Super Blocks containing stale data, e.g., the Super Blocks contain data that is no longer valid and are to be erased prior to becoming available to receive write data. The Super Blocks that are not marked as "USED" or "OLD" are free Super Blocks, e.g., erased Super Blocks that are currently available to receive write data.

As mentioned above, in one or more embodiments, control circuitry, e.g., control circuitry of controller 420, can be configured to write data corresponding to a particular LBA, e.g., LBA 0, to a selected one of the Super Blocks within a selected one of the multiple Groups in a first write operation and to write updated data corresponding to the particular LBA to a selected one of the Super Blocks within a selected one of the multiple Groups in a second write operation, e.g., a subsequent write operation.

As mentioned above, in one or more embodiments, the number of free physical blocks for each of the multiple Groups, e.g., GROUP 0 to GROUP 3, can be tracked. For example, as illustrated in FIG. 4A, GROUP 0 is determined to have four free Super Blocks, GROUP 1 is determined to have four free Super Blocks, GROUP 2 is determined to have five free Super Blocks, and GROUP 3 is determined to have 6 free Super Blocks, in this example. In the embodiment illustrated in FIG. 4A, the Group 435 (GROUP 3) is selected to receive the data corresponding to LBA 0 431 based on the determined number of free Super Blocks in each of the multiple Groups.

In this example, GROUP 3 is selected to receive the data corresponding to LBA 0 431 based on the fact that it is the Group having the highest number of free Super Blocks. That is, in FIG. 4A, Group 435 is selected because GROUP 3 has six free Super Blocks, which is more than the number of free Super Blocks available in the other Groups.

In one or more embodiments, the controller 420 assigns the received LBA, e.g., LBA 0 431 in the example shown in FIG. 4A, to a particular free physical Super Block within the selected Group, e.g., Group 435. For instance, the selected Group 435 can be searched to determine an appropriate free Super Block to receive the data corresponding to the associated write operation. In the example illustrated in FIG. 4A, the received LBA, e.g., LBA 0 431, is assigned to the Super Block located at position SB2 in GROUP 3, which is the selected Super Block 441. As such, the data corresponding to the first write operation associated with the example illustrated in FIG. 4A will be written to the PBA corresponding to the selected Super Block 441 within the selected Group 435.

FIG. 4B illustrates the status of the Super Blocks within GROUP 0 through GROUP 3 subsequent to the first write operation of FIG. 4A. As such, the status of the selected Super Block 441 is shown as USED in FIG. 4B since Super Block 441 now contains valid data and is no longer a free physical Super Block.

In the embodiment illustrated in FIG. 4C, logical block address 431 represents the same particular LBA (LBA 0) received by the controller 420 in association with a second write operation, e.g., a write operation subsequent to the write operation of FIGS. 4A and 4B. That is, the logical block address 431 in FIG. 4C represents LBA 0 in an updated state, e.g., the data associated with LBA 0 is updated data. The controller 420 is configured to write the updated data corresponding to LBA 0 431 to a selected one of the Super Blocks within a selected one of the multiple Groups in the second write operation, e.g., the subsequent write operation.

In one or more embodiments, and as illustrated in the example shown in FIG. 4C, the selected Group to receive the updated data associated with the subsequent write operation can be the same Group as that selected in the first write operation. That is, in one or more embodiments, once a particular LBA is assigned to a Group, that LBA can remain assigned to the Group such that updated data associated with the particular LBA in a subsequent write operation is written to a selected Super Block within the same Group.

For instance, in the example illustrated in FIGS. 4A and 4B, the received LBA associated with the first write operation, e.g., LBA 0 431, was assigned to GROUP 3. In the example illustrated in FIG. 4C, the same LBA, e.g., LBA 0 431, is received in connection with a subsequent write operation and the updated data is written to a free Super Block within the same Group, e.g., GROUP 3 in this example. In the example shown in FIG. 4C, the selected free Super Block to receive the updated data is located at position SB3 within the selected Group 438. As such, the selected Super Block 443 is marked as USED because it now contains valid data. As shown in FIG. 4C, the status of the Super Block 441 has changed from USED to OLD, since the data within Super Block 441 is now stale, e.g., invalid.

In one or more embodiments, and as described below in connection with FIG. 4D, the selected one of the multiple Groups to receive data corresponding to a particular LBA in a subsequent write operation (e.g., a second write operation) can be different from the selected one of the multiple Groups to receive data corresponding to the same particular LBA in a prior write operation (e.g., a first write operation). That is, in one or more embodiments, once a particular LBA is assigned to a Group, that LBA can be assigned to a different Group such that updated data associated with the particular LBA in a subsequent write operation is written to a selected Super Block within a different Group.

Figure 4D:
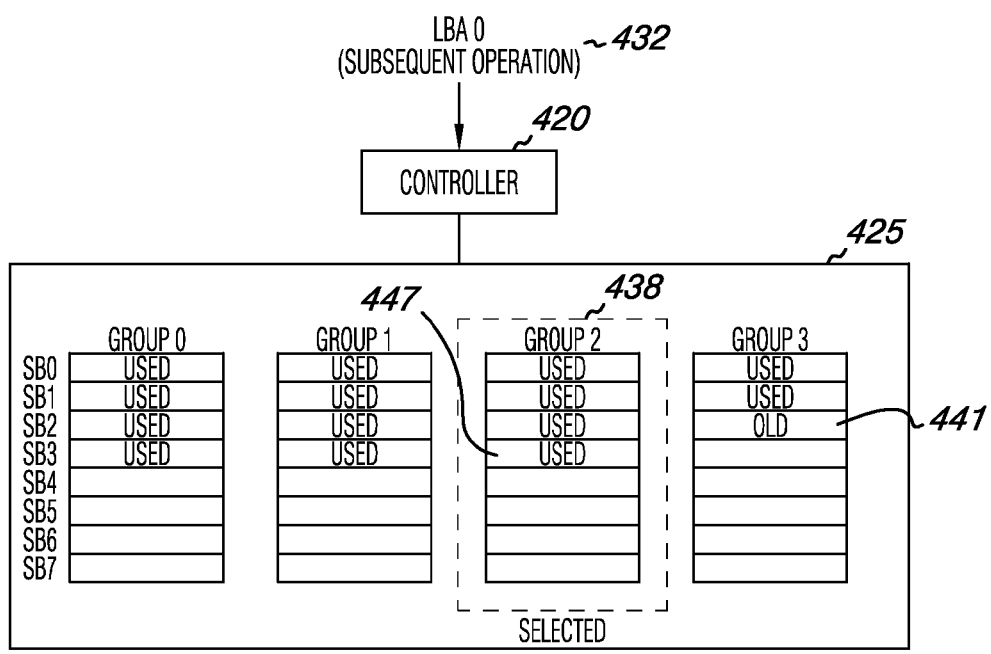

For instance, in the embodiment illustrated in FIG. 4D, logical block address 432 represents the same particular LBA (LBA 0) received by the controller 420 in association with a second write operation, e.g., a write operation subsequent to the write operation of FIGS. 4A and 4B. That is, the logical block address 432 in FIG. 4D represents LBA 0 in an updated state, e.g., the data associated with LBA 0 is updated data. The controller 420 is configured to write the updated data corresponding to LBA 0 432 to a selected one of the Super Blocks within a selected one of the multiple Groups in the second write operation, e.g., the subsequent write operation.

For instance, in the example illustrated in FIGS. 4A and 4B, the received LBA associated with the first write operation, e.g., LBA 0 431, was assigned to GROUP 3. In the example illustrated in FIG. 4D, the same LBA, e.g., LBA 0, is received in connection with a subsequent write operation and the updated data is written to a free Super Block within a different Group, e.g., GROUP 2 in this example. In the example shown in FIG. 4D, the selected free Super Block within selected Group 438 to receive the updated data is located at position SB3 within the selected Group 438. As such, the selected Super Block 447 is marked as USED because it now contains valid data. As shown in FIG. 4D, the status of the Super Block 441 has changed from USED to OLD, since the data within Super Block 441 is now stale, e.g., invalid.

In the embodiments illustrated in FIGS. 4A-4D, the Groups 435 and 438 can be selected based on which of the multiple Groups has the highest number of free physical blocks. That is, in FIGS. 4A and 4B, Group 435 is selected because GROUP 3 has six free Super Blocks, which is more than the number of free Super Blocks available in the other Groups. Similarly, in FIG. 4D, Group 438 is selected because GROUP 2 has five free Super Blocks prior to the subsequent write operation, which is more than the number of free Super Blocks available in the other Groups.

In the embodiments illustrated in FIGS. 4A-4D, the received LBA, e.g., LBA 0, is not pre-assigned to a particular one of the multiple Groups, e.g., GROUP 0 through GROUP 3. That is, LBA 0 is not pre-assigned to a particular Group prior to being assigned to the selected Group 435 in the first write operation, e.g., LBA 0 is an unassigned LBA prior to the first write operation.

In the embodiment illustrated in FIG. 4D, LBA 0 does not remain assigned to the selected Group 435 in the second write operation. Selecting different Groups for subsequent write operations associated with a particular LBA can result in benefits such as more efficient wear-leveling among multiple Groups.

As discussed above, in one or more embodiments, a count of free Super Blocks within each of the multiple Groups can be maintained, and a particular received LBA, e.g., LBA 0 in the embodiment illustrated in FIGS. 4A-4D can he assigned to one of the multiple Groups based, at least partially, on the count of free Super Blocks associated with the particular Group.

As mentioned above, one or more embodiments of the present disclosure can include determining physical blocks having stale data within the multiple Groups, as well as determining when the stale blocks are to be erased. The manner in which stale blocks within the multiple Groups are erased can affect the lifetime of a memory unit such as memory units 325 and 425 shown in FIGS. 3 and 4, respectively.

In one or more embodiments, stale physical blocks (e.g., blocks marked "OLD") that have been erased can be added to the number of free physical blocks available in each Group at particular times and on a Group by Group basis. For instance, in one or more embodiments, the controller, e.g., 420, can be configured to, for each of the multiple Groups, prevent physical blocks having stale data from being erased until the Group does not include any free physical blocks. As an example, the Super Blocks marked as "OLD" in the Groups shown in FIGS. 4C and 4D can be prevented from being erased until the particular Group no longer has any free Super Blocks available.

Also, in one or more embodiments, the controller can be configured to, for each of the multiple Groups, prevent erased Super Blocks within the Group from being added to the number of free Super Blocks associated with the Group until the Group does not include any free Super Blocks. For instance, in embodiments in which a list of available free Super Blocks is maintained, stale blocks, which have been erased such that they can receive new write data, can be prevented from being added to the list of available free Super Blocks until the particular Group does not include any free Super Blocks.

In one or more embodiments, stale blocks within a particular Group can be erased while the Group still has free Super Blocks. In some such embodiments, the stale blocks that have been erased may not be added to the list of free Super Blocks until a suitable time. Preventing stale blocks that have been erased from being immediately returned to the list of free Super Blocks can improve wear of the memory unit by preventing the newly erased stale blocks from being assigned an LBA and receiving new write data prior to the unwritten free Super Blocks on the list from being written to.

In one or more embodiments, erase operations are performed by erasing each of the physical blocks within a particular Super Block substantially simultaneously. For instance, with reference to FIG. 2, each of the physical blocks within Super Block 245-0 of Group 240-0 can be erased substantially simultaneously. In one or more embodiments, erasures of old blocks can be performed uniformly across different Groups. For instance, with reference to FIG. 2, the physical blocks within Super Block 245-1 of both Group 240-0 and 240-1 can be erased simultaneously. In one or more embodiments, the erasure of old blocks can be performed in a round-robin manner. For instance, with reference to FIG. 4A, a Super Block from GROUP 0 can be erased, and another Super Block from GROUP 0 may be prevented from being erased until a Super Block from each of GROUP 1, GROUP 2, and GROUP 3 has been erased.

CONCLUSION

The present disclosure includes methods and devices for memory block selection. Embodiments of the present disclosure can increase the life of memory units, such as flash memory units, by improving wear within memory units. In one or more embodiments, a memory controller includes control circuitry coupled to one or more memory devices having multiple Groups of planes associated therewith, each Group including at least two planes of physical blocks organized into Super Blocks, with each Super Block including a physical block from each of the at least two planes. The control circuitry is configured to receive a first unassigned logical block address (LBA) associated with a write operation and determine a particular free Super Block within a selected one of the multiple Groups to receive data associated with the write operation.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure.

It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A memory controller, comprising:
control circuitry coupled to one or more memory devices having multiple Groups of planes associated therewith, each Group including at least two planes of physical blocks organized into Super Blocks, with each Super Block including a physical block from each of the at least two planes, and wherein the control circuitry is configured to:
receive a first unassigned logical block address (LBA) associated with a write operation;
determine, based on a maintained count of free blocks available in the respective multiple Groups, a particular free Super Block within a selected one of the multiple Groups to receive data associated with the write operation;
assign the first unassigned LBA to the selected one of the multiple Groups such that data associated with all subsequent write operations corresponding to the previously unassigned first LBA is written to a free Super Block within the respective assigned Group;
track, for each of the multiple Groups, a number of free Super Blocks available in each Group;
determine which of the Super Blocks have stale data;
determine when the Super Blocks having stale data are to be erased; and
for each of the multiple Groups, prevent the Super Blocks having stale data from being erased until the Group does not include any free Super Blocks.

2. The memory controller of claim 1, wherein the control circuitry is configured to select the one of the multiple Groups to receive data associated with the write operation based, at least partially, on a ratio of free Super Blocks to used Super Blocks for each of the multiple Groups.

3. The memory controller of claim 1, wherein the control circuitry is configured to:
receive a different unassigned LBA associated with a subsequent write operation; and
determine a particular free Super Block within a selected one of the multiple Groups to receive data associated with the subsequent write operation.

4. The memory controller of claim 3, wherein the control circuitry is configured to select the one of the multiple Groups to receive data associated with the subsequent write operation on a round-robin basis.

5. The memory controller of claim 3, wherein the selected one of the multiple Groups associated with the subsequent write operation is different from the selected one of the multiple Groups associated with the write operation.

6. The memory controller of claim 1, wherein the control circuitry is configured to:
add erased Super Blocks to the number of free Super Blocks available in each Group at particular times and on a Group by Group basis.

7. The memory controller of claim 6, wherein the control circuitry is configured to, for each of the multiple Groups, prevent the erased Super Blocks from being added to the number of free Super Blocks available in the Group until the Group does not include any free Super Blocks.

8. A memory controller, comprising:
control circuitry coupled to a number of memory devices having multiple Groups of planes associated therewith, each Group including:
at least two planes of physical blocks; and
a number of Super Blocks with each of the Super Blocks comprising a respective collection of physical blocks including a physical block from each of the at least two planes of the Group; wherein the control circuitry is configured to:
receive a first unassigned LBA in association with a first write operation;
determine, based on a on a ratio of free Super Blocks to used Super Blocks for each of the multiple Groups, a selected free Super Block within a selected one of the multiple Groups to receive data associated with the first write operation;
assign the first unassigned LBA to the selected one of the multiple Groups such that data associated with all subsequent write operations corresponding to the previously unassigned first LBA is written to a free Super Block within the selected one of the multiple Groups;
write data corresponding to the first write operation to the selected free Super Block within the selected one of the multiple Groups
track, for each of the multiple Groups, a number of free Super Blocks available in each Group;
add erased Super Blocks to the number of free Super Blocks available in each Group at particular times and on a Group by Group basis; and
for each of the multiple Groups, prevent the erased Super Blocks from being added to the number of free Super Blocks available in the Group until the Group does not include any free Super Blocks.

9. The memory controller of claim 8, wherein the control circuitry is configured to:
receive a second unassigned LBA in association with a second write operation;
assign the second previously unassigned LBA to a selected Super Block within a selected one of the multiple Groups; and
write data corresponding to the second write operation to the selected Super Block.

10. The memory controller of claim 9, wherein the control circuitry is configured to:
determine, for each of the multiple Groups, a number of free Super Blocks; and
select the selected one of the multiple Groups to receive the data corresponding to the second write operation based, at least partially, on the number of free Super Blocks determined for each of the multiple Groups.

11. A memory controller, comprising:
control circuitry coupled to a number of memory devices having multiple Groups of planes associated therewith, each Group including a plane from at least two memory arrays and having a number of Super Blocks associated therewith, each of the Super Blocks comprising a respective collection of physical blocks including a physical block from each of the at least two memory arrays of a respective one of the Groups; and
wherein the control circuitry is configured to:
receive a first unassigned logical block address (LBA) in association with a first write operation;
determine, based on a maintained count of free blocks available in the respective multiple Groups, a particular free Super Block within a selected one of the multiple Groups to receive data associated with the first write operation;
assign a range of LBAs that includes the first unassigned LBA to a selected one of the multiple Groups such that data associated with all subsequent write operations corresponding to the range of LBAs that includes the first unassigned LBA is written to a free Super Block within the respective assigned selected one of the multiple Groups;
write data corresponding to the first write operation to a selected Super Block within the selected one of the multiple Groups;
receive a second LBA in association with a second write operation;
write data corresponding to the second write operation to the same selected Super Block when the second LBA is within the range of LBAs assigned to the selected one of the multiple Groups
track, for each of the multiple Groups, a number of free Super Blocks available in each Group;
determine which of the Super Blocks have stale data;
determine when the Super Blocks having stale data are to be erased; and
for each of the multiple Groups, prevent the Super Blocks having stale data from being erased until the Group does not include any free Super Blocks.

12. The memory controller of claim 11, wherein the control circuitry is configured to assign the second unassigned LBA to a different selected Super Block than the selected Super Block to which the data corresponding to the first write operation is written when second LBA is not within the range of LBAs assigned to the selected Super Block.

13. The memory controller of claim 12, wherein the different selected Super Block is located in a different selected one of the multiple Groups.

14. The memory controller of claim 13, wherein the control circuitry is configured to assign the second unassigned LBA to the different selected Super Block within the different selected one of the multiple Groups having the highest number of free Super Blocks.

15. A method for block selection in a memory system, the method comprising:
receiving a first logical block address (LBA) in association with a first write operation;
selecting a free Super Block within a selected Group of multiple Groups of planes to receive data associated with the first write operation, the selected Group determined based on a maintained count of free blocks available for each of the multiple Groups;
writing data corresponding to the first write operation to the selected free Super Block within the selected Group of multiple Groups;

wherein each of the Groups is a collection of at least two planes with each of the Super Blocks being a respective collection of one physical block from each of the at least two planes;

wherein the first LBA is not pre-assigned to a particular Super Block and is not pre-assigned to a particular one of the multiple Groups of planes;

responsive to the first write operation, assigning the first LBA to the selected Group such that data associated with all subsequent write operations corresponding to the previously unassigned LBA is written to a free Super Block within the assigned Group;

receiving a second LBA associated with a subsequent write operation; and writing data corresponding to the subsequent write operation to a selected free Super Block within a selected one of the multiple Groups;

wherein the second LBA is not pre-assigned to a particular Super Block and is not pre-assigned to a particular one of the multiple Groups;

removing the free Super Block written to in association with the first write operation from a list of available free Super Blocks associated with the respective selected Group after the first write operation;

removing the Super Block written to in association with the second write operation from a list of available free Super Blocks associated with the respective selected Group after the subsequent write operation; and preventing a respective one of the removed Super Blocks from being returned to a respective one of the lists until each of the Super Blocks of the respective one of the Groups has been written to at least once.

16. The method of claim 15, including selecting the selected Group associated with the first write operation based, at least partially, on a ratio of free Super Blocks to used Super Blocks in the respective selected Group as compared to a ratio of free Super Blocks to used Super Blocks in each of the other Groups.

17. The method of claim, wherein selecting the selected one of the multiple Groups associated with the subsequent write operation includes selecting a Group different from the selected one of the multiple Groups associated with the first write operation.

18. The method of claim 15, including, for each Group:
tracking a number of free Super Blocks in the Group;
removing a Super Block from a list of free Super Blocks subsequent to the Super Block being written to; and
adding the Super Block to the list of free Super Blocks subsequent to the Super Block being erased.

19. The method of claim 15, including performing erase operations on the Super Blocks by erasing all of the physical blocks within a particular Super Block substantially simultaneously.

20. The method of claim 19, including performing erase operations on the memory system by erasing at least one Super Block from each of the multiple Groups substantially simultaneously.

* * * * *

UNITED STATES PATENT AND TRADEMARK OFFICE
CERTIFICATE OF CORRECTION

PATENT NO. : 8,239,614 B2
APPLICATION NO. : 12/397402
DATED : August 7, 2012
INVENTOR(S) : Mehdi Asnaashari et al.

It is certified that error appears in the above-identified patent and that said Letters Patent is hereby corrected as shown below:

In column 17, line 25, in Claim 8, delete "on a on a" and insert -- on a --, therefor.

In column 20, line 9, in Claim 17, delete "claim," and insert -- claim 15, --, therefor.

Signed and Sealed this
Second Day of October, 2012

David J. Kappos
*Director of the United States Patent and Trademark Office*